(12) United States Patent
Raghoebardayal (10) Patent No.: US 9,480,917 B2
(45) Date of Patent: Nov. 1, 2016

(54) SYSTEM AND METHOD OF IMAGING (71) Applicant: Sony Computer Entertainment Europe Limited, London (GB)

(72) Inventor: Sharwin Winesh Raghoebardayal, London (GB)

(73) Assignee: Sony Computer Entertainment Europe Limited (GB)

( * ) Notice: Subject to any disclaimer, the term of this patent is extended or adjusted under 35 U.S.C. 154(b) by 558 days.

(21) Appl. No.: 13/782,249

(22) Filed: Mar. 1, 2013

(65) Prior Publication Data

US 2013/0250042 A1 Sep. 26, 2013

(30) Foreign Application Priority Data

Mar. 21, 2012 (GB) .................................. 1204969.8

(51) Int. Cl.
| H04N 7/18 | (2006.01) |
| A63F 13/42 | (2014.01) |
| H04N 13/02 | (2006.01) |
| A63F 13/655 | (2014.01) |
| A63F 13/213 | (2014.01) |
| A63F 13/20 | (2014.01) |
| G06T 3/00 | (2006.01) |

(52) U.S. Cl.
CPC ............. *A63F 13/42* (2014.09); *A63F 13/06* (2013.01); *A63F 13/213* (2014.09); *A63F 13/655* (2014.09); *G06T 3/0068* (2013.01); *H04N 13/0207* (2013.01); *A63F 2300/1093* (2013.01)

(58) Field of Classification Search
None
See application file for complete search history.

(56) References Cited

U.S. PATENT DOCUMENTS

| 5,313,306 A * | 5/1994 | Kuban et al. ................... 348/65 |
| 6,459,451 B2 | 10/2002 | Driscoll, Jr. et al. |
| 7,327,442 B1 * | 2/2008 | Fear et al. ................... 356/4.08 |
| 8,123,622 B1 | 2/2012 | Young et al. |
| 2003/0103063 A1 | 6/2003 | Mojaver et al. |
| 2004/0189876 A1 | 9/2004 | Shirato |
| 2010/0002070 A1 | 1/2010 | Ahiska |

FOREIGN PATENT DOCUMENTS

EP 2184632 A2 5/2010

OTHER PUBLICATIONS

"Kinect Chapters 1 & 2, Kinect Imaging—Draft #1 (Sep. 15, 2011)—Andrew Davison 2011", Java Prog. Techniques for Games, Sep. 15, 2011, pp. 1-38, XP002:703922.*
Andrew Davison: "Kinect Chapters 1 & 2. Kinect Imaging—Draft #1", Java Prog. Techniques for Games, Sep. 15, 2011, pp. 1-38, XP002703922.

(Continued)

*Primary Examiner* — James M Anderson, II
(74) *Attorney, Agent, or Firm* — Lerner, David, Littenberg, Krumholz & Mentlik, LLP (57) ABSTRACT

An imaging system includes a video camera having a wide field of view lens, an imaging sensor operable to form a first image having a first pixel area, and an interface operable to receive commands from a host entertainment device. The video camera is operable to receive a command requesting at least one secondary image having a second pixel area for a 3D mapping of a portion of the first image. The system includes a graphics processor operable to perform the 3D mapping to generate the at least one each secondary image from the first image. The 3D mapping transforms a section of the first image depicting a surface having a normal in a first direction to form a secondary image in which the normal of that surface faces directly out of the secondary image.

15 Claims, 8 Drawing Sheets

(56) References Cited

OTHER PUBLICATIONS

Andrew Davison: "NUI Chapter 13. Kinect Imaging—Draft #1", Archive.com Java Prog. Techniques for Games,Oct. 18, 2011, pp. 1-38, XP002703923.
Anonymous: "Kinect", Wikipedia, the free encyclopedia, Nov. 29, 2011, pp. 1-18, XP002664941.
Anonymous: "NUI Chapter 13. Kinect Imaging—Draft #1", Internet Archive Wayback Machine, Jul. 19, 2013, XP002703924.
Anonymous: "Nyko Zoom Review",SelectButton, Sep. 13, 2011, XP002703731.

Exended European Search Report for Application No. 13152767 dated Sep. 16, 2013.
Leandro Cruz et al: "Kinect and RGBD Images: Challenges and Applications", Graphics, Patterns and Images Tutorials (SIBGRAPI-T), 2012 25th SIBGRAPI Conference on, IEEE, Aug. 22, 2012, pp. 36-49, XP032283171.
Examination Report from Great Britain for Application No. GB1204969.8 dated Jan. 16, 2014.
Search Report from Great Britain for Application No. GB1204969.8 dated Jul. 13, 2012.
Examination Report from Great Britain for Application No. GB1204969.8 dated Jul. 16, 2012.

* cited by examiner

SYSTEM AND METHOD OF IMAGING

CROSS REFERENCE TO RELATED APPLICATIONS

The present application claims the benefit of and priority to GB Application No. 1204969.8, filed Mar. 21, 2012, the entire disclosure of which is incorporated by reference herein.

BACKGROUND OF THE INVENTION

1. Field of the invention

The present invention relates to a system and a method of imaging.

2. Description of the Prior Art

Many modern videogame devices utilise a video camera to capture video images of a scene. Typically these are used to estimate user postures (for example in dance games), or to identify special objects within the captured scene, such as so-called fiduciary markers, which comprise high-contrast asymmetric patterns whose position and orientation within the video image can be uniquely determined.

In either case, the videogame device may then process the image to augment it for display on a TV or the like, for instance by overlaying a virtual object on the image of the user, or positioning a virtual object in the video image at a position and orientation consistent with that of the fiduciary marker.

However, the detection of such features within video images requires considerable data processing, and notably the amount of processing can vary depending on where in the scene the user of fiduciary marker is. This is primarily because the user or marker's location affects their size in the resulting video images and consequently the number of pixels that the videogame device must process.

This in turn makes the maintenance of video frame rates and the budgeting of available processing resources difficult, as the position of the user or marker is generally out of the videogame device's control.

In addition, tracking users or markers is made more complicated when some or all of the user or marker moves outside the field of view of the video camera, either because they have moved significantly within the scene or because they have got too close to the camera.

The present invention seeks to mitigate the above problems.

SUMMARY OF THE INVENTION

In a first aspect, an imaging system is provided in accordance with claim 1.

In another aspect, a method of imaging is provided in accordance with claim 13.

Further respective aspects and features of the invention are defined in the appended claims.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

A system and method of imaging are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
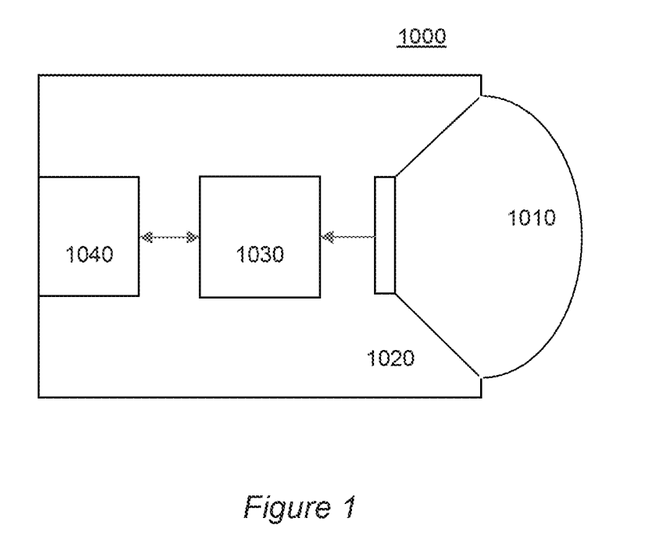
FIG. 1 is a schematic diagram of a video camera in accordance with an embodiment of the present invention.

Referring now to FIG. 1, a video camera 1000 for connection to a host entertainment device 10 comprises a wide field of view lens 1010, an imaging sensor 1020 operable to form a first image having a first pixel area, a graphics processor 1030, and an interface 1040 operable to receive commands from the host device.

In use, the video camera is operable to receive a command requesting at least one secondary image having a second pixel area, with the or each secondary image being at least a respective portion of the first image, and the graphics processor is operable to generate the or each secondary image from the first image and provide the or each secondary image to the host entertainment device via the interface.

In embodiments of the present invention the wide field of view lens 1010 may be one of a so-called wide angle lens with a field of view typically in the range 64° to 84°; a so-called ultra-wide angle lens with a field of view typically in the range 84° to 114°; and a so-called fish-eye lens, with a field of view typically in the ranges 110° to 180° or more typically 150° to 180°. Notably, the fish-eye lens type causes visible curvilinear distortion to resulting images. It will be appreciated that as the field of view widens, more of the non-occluded sections of the environment are captured by the lens, up to a hemispherical capture of everything visible forward of the lens in the case of a 180° fish eye lens.

In embodiments of the present invention, the imaging sensor is a so-called charge-coupled device (CCD), although any suitable digital imaging sensor may be used. The imaging sensor has a comparatively large pixel area compared to the images output by the videogame device.

Typically the videogame device will generate images having a pixel area in the order of 1280×720 pixels (the 720 p/720 i HDMI standard), roughly equal to one megapixel, or 1920×1080 pixels (the 1080 p/1080 i HDMI standard), roughly equal to two megapixels.

By contrast, the imaging sensor has a pixel area in the order of at least three megapixels, and may have a pixel area in the order of 4 to 10 megapixels or higher. The preferred pixel area will depend on designer preferences and other considerations such as cost and camera size.

Thus more generally, the imaging sensor will typically have a pixel area at least twice that of the pixel area of the display.

It will be understood that 'pixel area' refers to the number of pixels in a captured or displayed image, and not the physical area occupied by those pixels (which is determined in conjunction with the pixel pitch). The pixel area is often referred to as the 'resolution' of an image, imaging sensor or a display, and this meaning is used herein. Hence for example '1920×1080 pixels' simultaneously identifies the image dimensions, pixel area, and resolution.

In a variant embodiment of the present invention, the imaging sensor operates together with the graphics processor to upscale the original captured image to a higher initial resolution being at least twice that of the pixel area of the display, which is treated as if it was output by the imaging sensor.

In a variant embodiment of the present invention, two or more imaging sensors are used in combination to generate an image having a higher resolution that that of any one of the used sensors, the higher resolution again being at least twice that of the pixel area of the display, and again being treated as if it was output by the imaging sensor. In another variant embodiment, an imaging sensor operates at an increased frame rate (or example, double the output frame rate), and the additional frames are used to interpolate a higher resolution output image, the higher resolution again being at least twice that of the pixel area of the display, and again being treated as if it was output by the imaging sensor.

In these variant embodiments, the image sensor itself may be natively 1080 p resolution.

Figure 2:
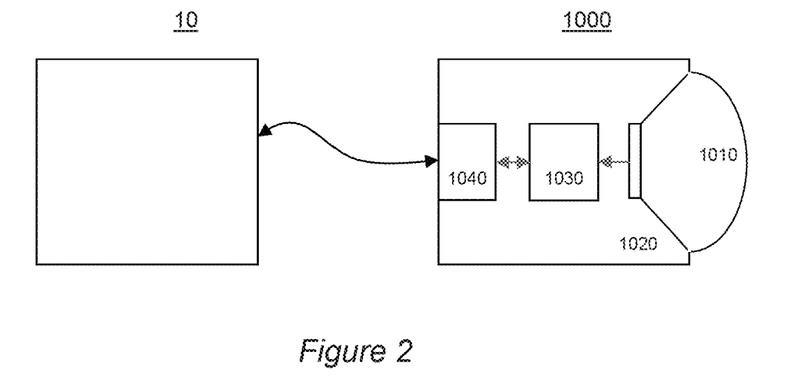
FIG. 2 is a schematic diagram of an imaging system in accordance with an embodiment of the present invention.

Referring now also to FIG. 2, in an embodiment of the present invention, the interface 1040 is arranged in operation to connect to a host entertainment device 10, such as the Sony® PlayStation® 3 (PS3®). The connection may for example be via a USB cable, which also provides power to the video camera 1000. Alternatively, the video camera may be powered by another source and communicate with the host entertainment device wirelessly. Together the PS3 host entertainment device and the camera form an imaging system.

The interface 1040 is operable to receive commands from the host entertainment device.

In an embodiment of the present invention, a first form of such commands comprises:
  i. a request for a secondary image;
  ii. an initial coordinate pair;
  iii. an indicator of region size; and
  iv. a desired resolution (pixel dimensions or pixel area).
   where the secondary image is to be extracted or otherwise generated from a first or
The command may omit the desired resolution, in which case a default resolution is used (either set at manufacture, or previously set by a command from the host entertainment device). Possible desired / default resolutions include, but are not limited to:
  i. 1920×1080 pixels;
  ii. 1280×720 pixels;
  iii. 1024×768 pixels;
  iv. 640×480 pixels;
  v. 320×240 pixels;
  vi. 256×256 pixels; and
  vii. 128×128 pixels.

The initial co-ordinate pair defines where the secondary image is to be extracted from the first or primary image, and typically specifies which pixel of the first image will correspond to one of the corners of the secondary image (such as the top-left corner). Alternatively it could define a centre point.

The indicator of region size is used to define the size in pixels of the region of the first image that is to act as the source for the secondary image. The indicator may take the form of a second co-ordinate pair defining the diagonally opposite corner of the region, or may take the form of a pixel area, which in conjunction with an aspect ratio based upon the current desired or default resolution can be used to define the region size in pixels. Given the area and aspect ratio the region can again be defined.

Notably therefore the region size (in pixels) within the first image may not be the same as the pixel area of the intended secondary image.

However if the region size is omitted from the command, then the region size is assumed to be the same as the current desired or default resolution for the secondary image.

Consequently, if the pixel area of a requested secondary image is not the same as the pixel area of the region size of the first image, the graphics processor resamples the corresponding region size of the first image to generate the secondary image. Thus if the size of the secondary image is smaller than the specified region size of the first image, then the graphics processor sub-samples the region of the first image. Meanwhile if the size of the secondary image is larger than the specified region size of the first image, then the graphics processor super-samples the region of the first image.

By selective use of the co-ordinates, region size and second image size, a host device can thus digitally pan, tilt and zoom without any additional mechanical components being required.

Notably, in an embodiment of the present invention, the PS3 can request a plurality of such secondary images from a single first image, each corresponding to a respective region of the first image and potentially referring to regions of different sizes, and/or secondary images of different sizes.

Thus for example the PS3 may be tracking a user's head and a fiduciary marker captured within the video sequence, and for the user's head may request a 256×256 pixel secondary image based upon a 512×512 region of the first image at a position predicted by a tracking algorithm of the PS3, and meanwhile also request a 128×128 pixel secondary image based upon a different 384×384 region of the same first image, again positioned according to a tracking algorithm.

In this way, the host device can perform AR tracking on multiple objects and optionally at different resolutions.

Finally the PS3 may also request a 1280×720 pixel secondary image corresponding to the whole of the first image. This may be requested using the first form of command specified above, or may use a separate command that requests a full image at the current desired resolution.

As noted above, in embodiments of the present invention the wide field of view lens may be what is commonly known as a fish-eye lens, which introduces curvilinear distortions to the captured video image. In such embodiments, optionally the graphics processor is operable to implement a so-called 'de-fishing' process that uses the optical specifications of the fish-eye lens to substantially reverse the curvilinear distortion to remove it and restore a rectilinear appearance to the image.

Whilst this may be done on the first image, it is less processor intensive to perform the operation on the lower resolution secondary images. This may be done by resampling the first image to conform to the resolution of a requested secondary image and then performing the de-fishing process. In principle it is also possible to perform the de-fishing process on an interim version of the secondary image that comprises an additional border of image information (for example having a pixel area 10% larger than the requested secondary image).

The border of additional image data allows for the removal of the curvilinear distortion within the actual area of the secondary image without image loss, as the border area allows for the repositioning of pixels into or out of the area of the actual secondary image. The border area is then cropped off to produce the final secondary image. This approach requires still less computational load from the graphics processor.

Referring now also to FIGS. 3A and 3B and 4A and 4B, in an embodiment of the present invention, a second form of command from the host entertainment device to the camera comprises:

i. a request for a secondary image;
ii. an initial coordinate pair;
iii. an indicator of region size;
iv. a desired resolution (pixel dimensions or pixel area); and
v. a 3D to 2D mapping Items i. to iv. operate as before. Meanwhile, item v. is a request to treat the region of the primary image as if it is rotated in 3D space, and to map it back to a planar 2D image using a transformation mapping provided by the PS3.

Figure 3A:
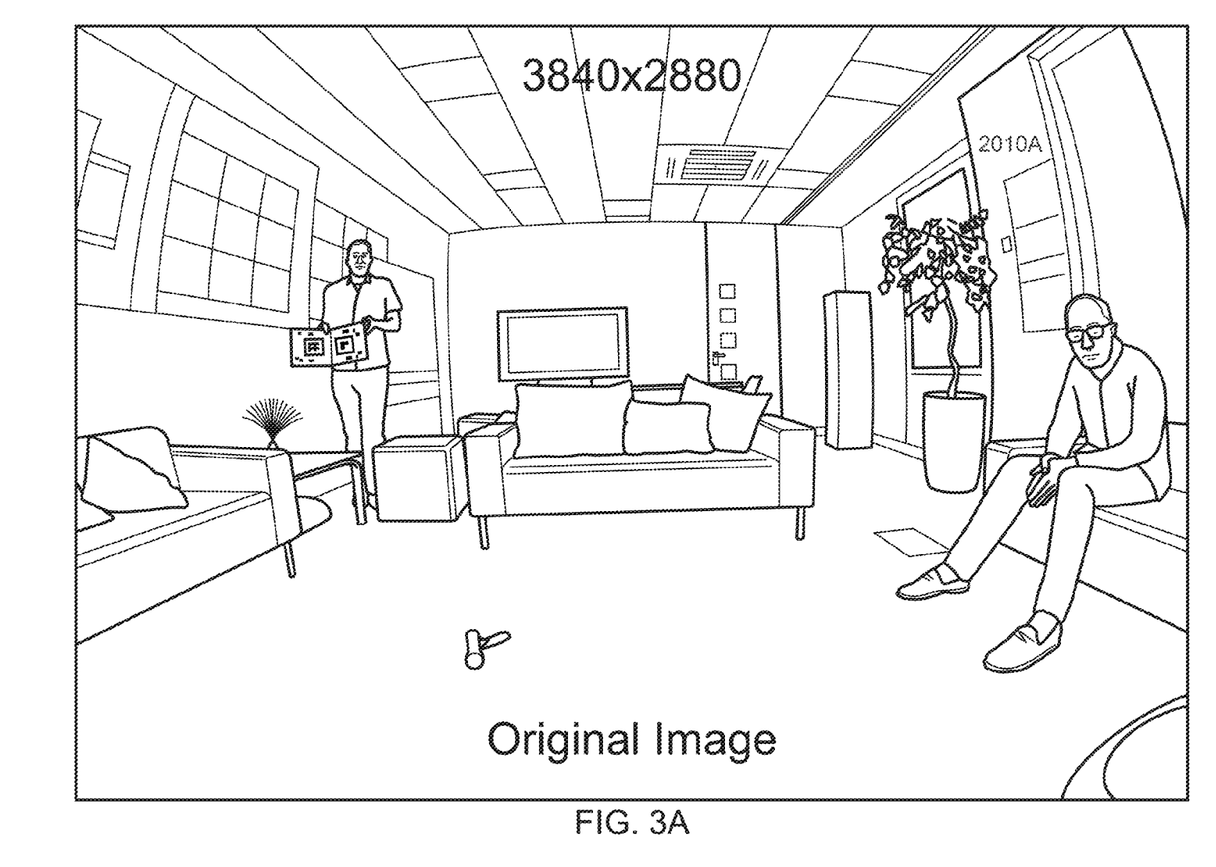
FIG. 3A illustrates an image captured by a video camera according to an embodiment of the present invention.
Figure 3B:
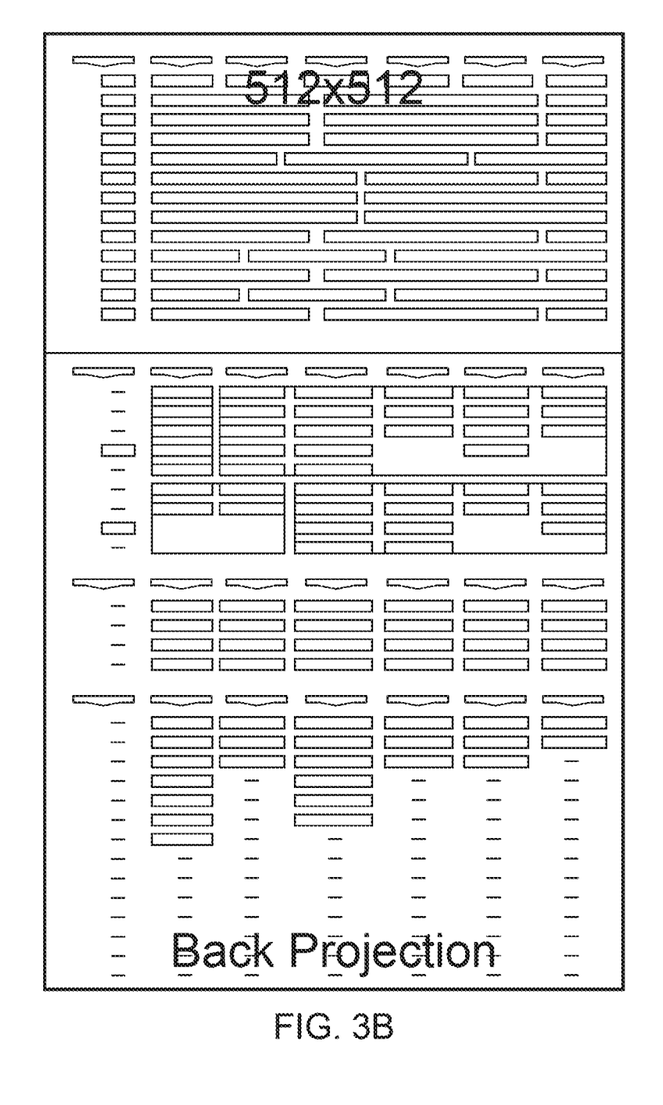
FIG. 3B illustrates an image generated by a video camera according to an embodiment of the present invention.

FIGS. 3A and 3B illustrate this for a real-world implementation. FIG. 3A is a representation of a first image captured by the imaging sensor, and shows a room in which a first person is standing to the left (and holding a fiduciary marker) and a second person is sitting to the right. There is some curvilinear distortion in the image due to the fisheye lens used by the camera to obtain the wide field of view.

On the wall above the seated person is a poster chart 2010A. In an example of the second form of command, a request was made to provide a 512×512 pixel secondary image of a region encompassing this poster chart, based upon a 3D to 2D mapping. The 3D to 2D mapping uses an estimate of the normal (a line orthogonal to the surface of the poster chart) in 3D space, and rotates or 'back-projects' the space until the normal face substantially directly out of the secondary image, as would be the case in a conventional planar image.

The result can be seen in FIG. 3B, in which the (cropped) poster chart appears to be viewed face-on in the secondary image.

Hence more generally, the 3D to 2D mapping rotates an estimated normal of a feature in the scene in 3D space so that its normal substantially coincides with the normal of the 2D plane of the secondary image. As such, it performs a perspective correct projection of any part of the scene as identified by the host device.

How the normal is estimated is described later herein.

Figure 4A:
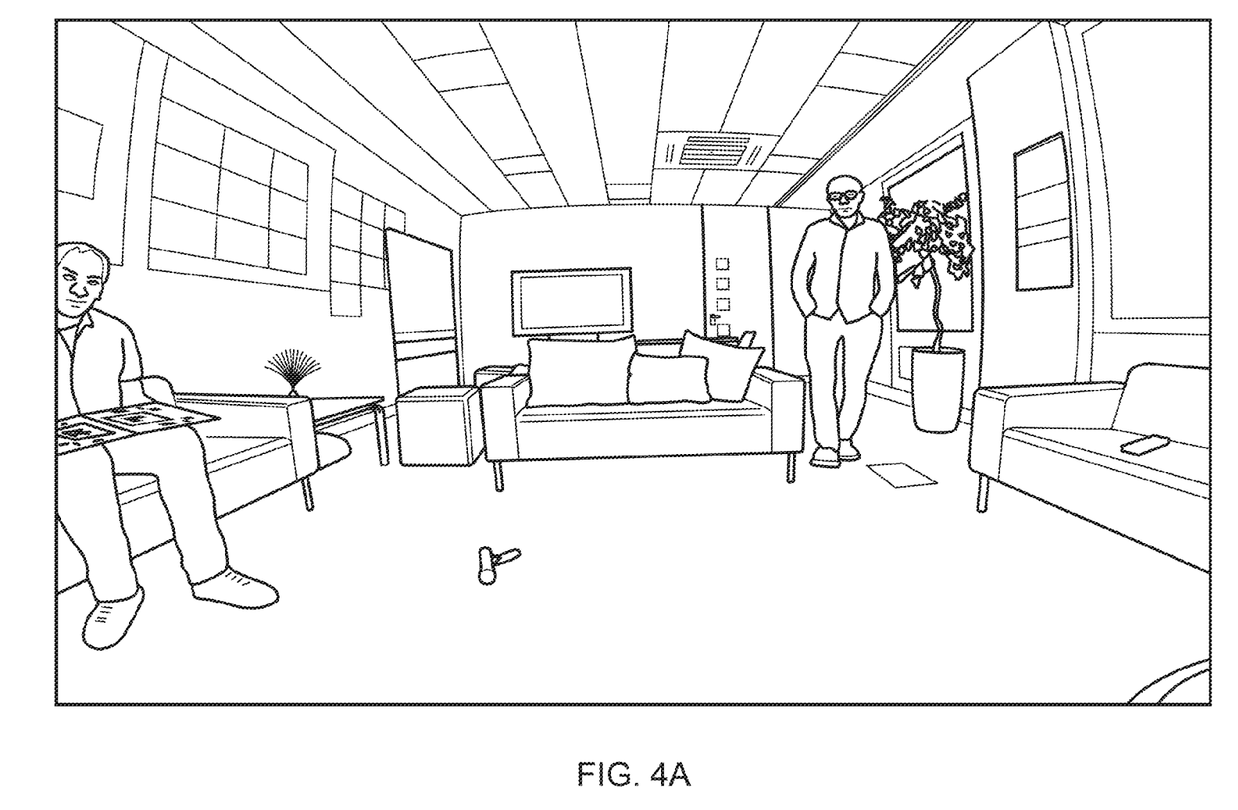
FIG. 4A illustrates an image captured by a video camera according to an embodiment of the present invention.
Figure 4B:
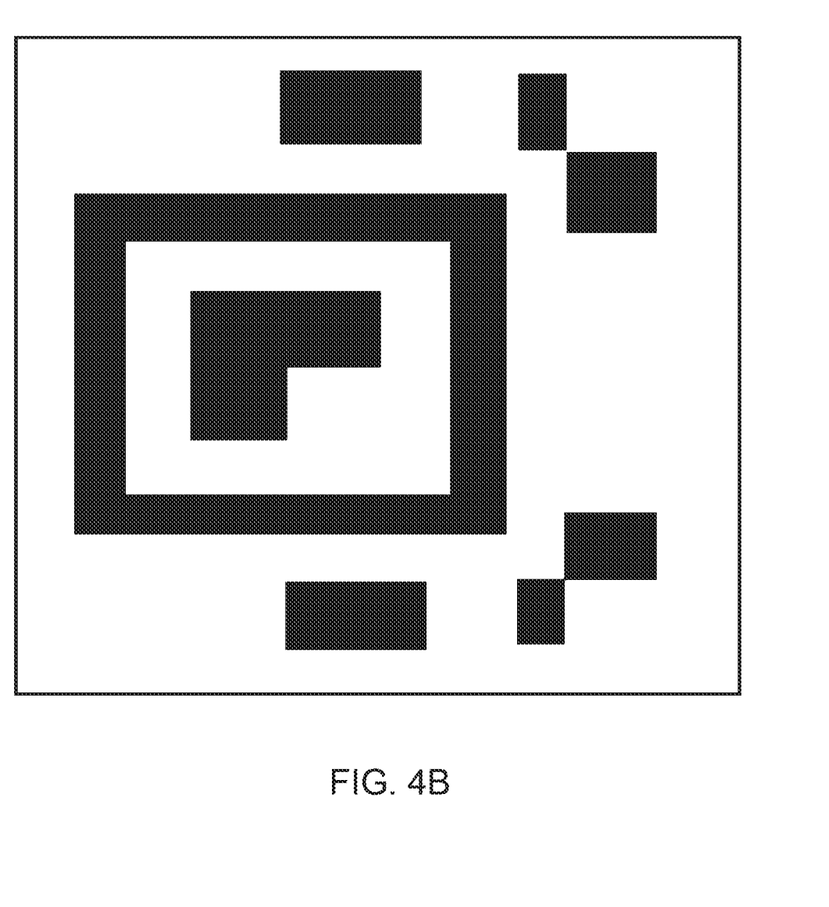
FIG. 4B illustrates an image generated by a video camera according to an embodiment of the present invention.

Another example is given in FIGS. 4A and 4B. FIG. 4A is a representation of a first image captured by the imaging sensor, and again shows the room, in which the first person is sitting to the far left (and holding the fiduciary marker) and the second person is standing slightly to the right.

In this case, in the second form of command, the request was made to provide a 512×512 pixel secondary image of a region encompassing the fiduciary marker, again based upon a 3D to 2D mapping. Again the 3D to 2D mapping uses an estimate of the normal to the surface of the fiduciary marker in 3D space, and rotates the region of the first image until the normal is substantially aligned with the normal of the 2D plane of the secondary image. Hence as can be seen from FIG. 4B, a substantially face-on representation of the fiduciary marker is obtained.

Advantageously, by requesting a 512×512 pixel secondary image of the marker at successive video frames, this means that the image of the marker for analysis by the PS3 is substantially the same for every video frame, regardless of variations in the size of the marker within the first image. This makes budgeting of the computational resources of the PS3 much easier.

Notably also, in this example the video camera was requested to output a 1280×720 pixel version of the full first image for display back to the user (i.e. a 720 p HDMI image for display on a TV). However if this was the only image received by the PS3, then the image of the fiduciary marker would occupy a region approximately 120 pixels wide and 50 pixels high; consequently any attempt to recognise the markings on the fiduciary marker from the output image would be based on a poor, low-resolution version of the marker and would be less reliable and in particular more prone to jitter due to poorer edge detection.

However by also requesting and obtaining a 512×512 pixel secondary image of the region encompassing the fiduciary marker based upon the high resolution first image, the details on the marker are much clearer. Meanwhile the orientation of the fiduciary marker is known from the 3D to 2D mapping, and can be further refined by analysis of the secondary image to detect whether the marker surface is exactly equal to the plane of the secondary image, and to correct for differences.

Furthermore, it will be appreciated that optionally rotating the marker image in the camera using the 3D to 2D mapping further reduces the computational overhead for the PS3, although optionally the mapping (or further mapping) may instead be performed by the Cell processor and/or RSX of the PS3 if desired.

Finally, it will be appreciated that in embodiments of the present invention the request from the PS3 can in principle specify an arbitrary region shape from the first image. In particular, and with reference again to FIG. 4A, the region can be selected as a polygon in anticipation of that polygon being rectified into a regular rectangle or square by the 3D to 2D mapping process. In such cases, the resulting transformed region may not perfectly occupy the dimensions of the secondary image, in which case resulting 'empty' pixels of the secondary image can be indicated as such using a reserved data pattern, for example in a similar manner to transparent pixels in a GIF format image.

Figure 5:
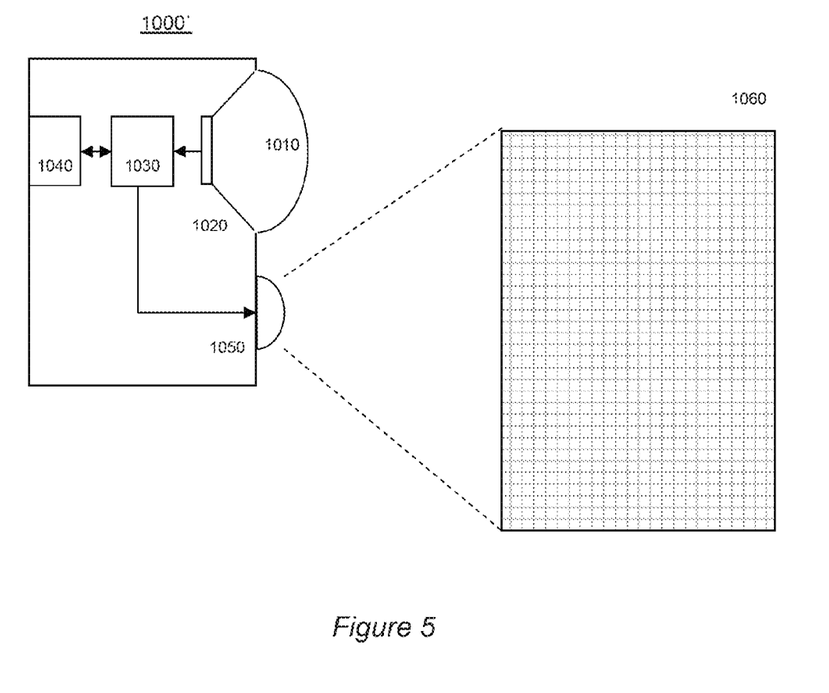
FIG. 5 is a schematic diagram of a video camera in accordance with an embodiment of the present invention.

Referring now to FIG. 5, in an embodiment of the present invention the video camera 1000' comprises a so-called structured light emitter 1050 operable to emit a pattern of light 1060 that is projected onto the scene.

Typically the light is infra-red and hence invisible to the user, but typical CCDs of the type proposed for the imaging means can detect light in the near infra-red. Hence in an embodiment of the present invention the CCD outputs four colour channels RGBI—red, green, blue and infra-red.

In the case where the CCD does not separate the red and infra-red colours, then the pattern can be detected by projecting the pattern in synchronisation with alternating video frames and comparing temporally adjacent frames in the red channel; the differences between frames will be primarily due to the projected pattern.

In either case, the distortions to the known pattern caused by the topology of the scene enable either the graphics processor of the camera or a processor of the host computer to estimate a depth map for the scene.

The depth map may be estimated continuously (on a frame-by-frame, or alternate frame, basis) or only may be estimated initially for the static elements of the scene.

It will be appreciated that the graphics processor on the camera can utilise the higher resolution first image and so potentially is able to generate a superior depth map to one based upon a resampled image sent to the host entertainment device. Hence in an embodiment of the present invention, the depth map is computed by the camera's graphics processor using either the first image or a resampled image that is nonetheless of a higher overall resolution than any corresponding output image sent to the host entertainment device.

The granularity of the depth map may be improved (in particular for the static elements of the scene) by projecting different patterns for different video frames. For example a first grid pattern may alternate with a second grid pattern offset horizontally and vertically by ½ a grid pitch, so doubling the overall resolution of the obtainable depth map. Alternatively, a structured light projection mechanism projecting a single pattern may be arranged to move between one or more frames to achieve a similar effect, for example using piezoelectric actuators; however this may cause unwanted noise and/or vibration.

Combining the depth map with the first image (or correspondingly re-sampled images and depth maps) enables either the camera or the host entertainment device to estimate the depth or distance of key points in the image from the camera and hence construct an approximate 3D model of the visible scene. Consequently it is also able to estimate the plane of a surface (from the position and depth of at least three points) and hence also estimate the normal of that surface for the purpose of requesting or implementing a 3D to 2D conversion of the type described previously. Consequently the host or camera can derive the normals for one or more surfaces of the scene.

The key points in the image may for example correspond to points in the image or depth map where there is a notable change in value between adjacent pixels, for example a change in colour or depth that exceeds a predetermined threshold.

Another benefit of the above arrangement is that by downsampling the whole of the first image to a lower resolution secondary image, the secondary image used to provide display feedback to the user is less likely to show noise artefacts due to low light levels.

It will be appreciated that a similar depth map for similar use may be calculated instead using a stereoscopic image from a stereoscopic version of the camera described herein. Correspondingly, stereoscopic secondary images and 3D mappings may be produced if desired, for example for use with a 3D display.

Figure 6:
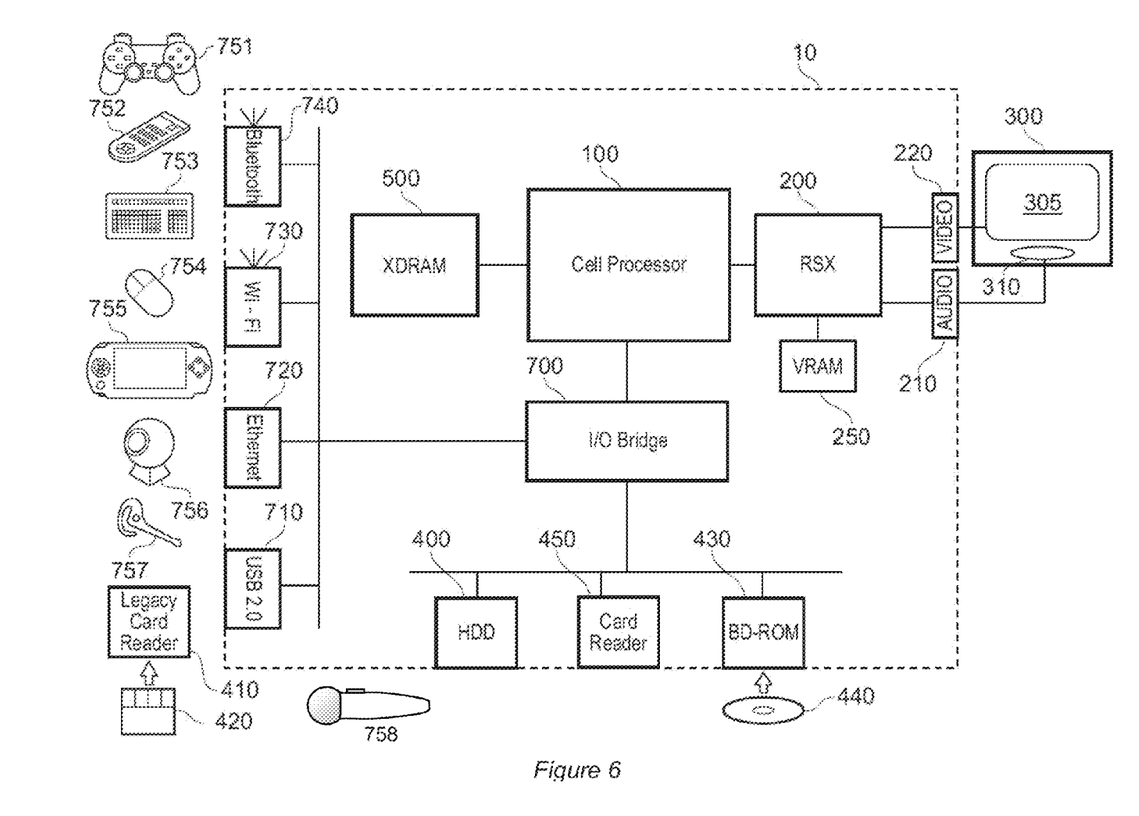
FIG. 6 is a schematic diagram of a host entertainment device in accordance with an embodiment of the present invention.

With reference to FIG. 2 and now also FIG. 6, as noted above the camera and host entertainment device together form an imaging system.

In an embodiment of the present invention again as noted above the Sony® Playstation 3® entertainment device or PS3®, operating under suitable software instruction, is a suitable host entertainment device.

FIG. 6 schematically illustrates the overall system architecture the PS3, which comprises a system unit 10, to which various peripheral devices are connectable including the video camera, as detailed below.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

In particular, one or more of these connections enable the video camera 1000 or a stereoscopic version of the video camera (not shown) to be coupled to the PS3 in order to capture a video image (or stereoscopic video image pair) of the scene.

The provision of these interfaces means that the PlayStation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the PlayStation® or PlayStation 2® devices.

In an embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analog joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the portable entertainment device 755 or the PlayStation Move® 758 may be used as a controller. In the case of the portable entertainment device, additional game or control information (for example, control instructions or number of lives) may be provided on the screen of the device. In the case of the PlayStation Move, control information may be provided both by internal motion sensors and by video monitoring of the light on the PlayStation Move device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the PlayStation and PlayStation 2 devices, in addition to conventional pre-recorded and recordable CDs, and so-called Super Audio CDs. The reader 430 is also operable to read DVD-ROMs compatible with the PlayStation 2 and PlayStation 3 devices, in addition to conventional pre-recorded and recordable DVDs. The reader 430 is further operable to read BD-ROMs compatible with the PlayStation 3 device, as well as conventional pre-recorded and recordable Blu-Ray Disks.

The system unit 10 is operable to supply audio and video, either generated or decoded by the PlayStation 3 device via the Reality Synthesiser graphics unit 200, or obtained from the camera 1000, through audio and video connectors to a display and sound output device 300 such as a monitor or television set having a display 305 and one or more loudspeakers 310. The audio connectors 210 may include conventional analogue and digital outputs whilst the video connectors 220 may variously include component video, S-video, composite video and one or more High Definition Multimedia Interface (HDMI) outputs. Consequently, video output may be in formats such as PAL or NTSC, or in 720 p, 1080 i or 1080 p high definition.

Audio processing (generation, decoding and so on) is performed by the Cell processor 100. The PlayStation 3 device's operating system supports Dolby® 5.1 surround sound, Dolby® Theatre Surround (DTS), and the decoding of 7.1 surround sound from Blu-Ray® disks.

In the present embodiment, the video camera graphics processor may comprise real-time data compression and encoding apparatus so that compressed video data may be transmitted in an appropriate format such as an intra-image based MPEG (motion picture expert group) standard for decoding by the system unit 10. Embodiments of the video camera 1000 may variously connect to the system unit 10 via a USB, Bluetooth or Wi-Fi communication port as noted previously. Embodiments of the video camera may include one or more associated microphones and also be capable of transmitting audio data. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled person will be aware that a device driver or similar software interface may be required in the present embodiment described.

The software supplied at manufacture comprises system firmware and the PlayStation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the PlayStation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other PlayStation 3 device users nominated by the user of the current device; for example, by text, audio or video depending on the peripheral devices available. The on-line capability also provides for on-line communication, content download and content purchase during play of a suitably configured game, and for updating the firmware and OS of the PlayStation 3 device itself. It will be appreciated that the term "on-line" does not imply the physical presence of wires, as the term can also apply to wireless connections of various types.

Hence the PS3 also provides a processor (the Cell processor) operable to generate commands (for example commands of the first and second type described previously) requesting from the video camera one or more secondary images based upon a first image captured by the video camera, and the video camera is operable to provide the or each secondary image to the PS3 via their respective interfaces.

Figure 7:
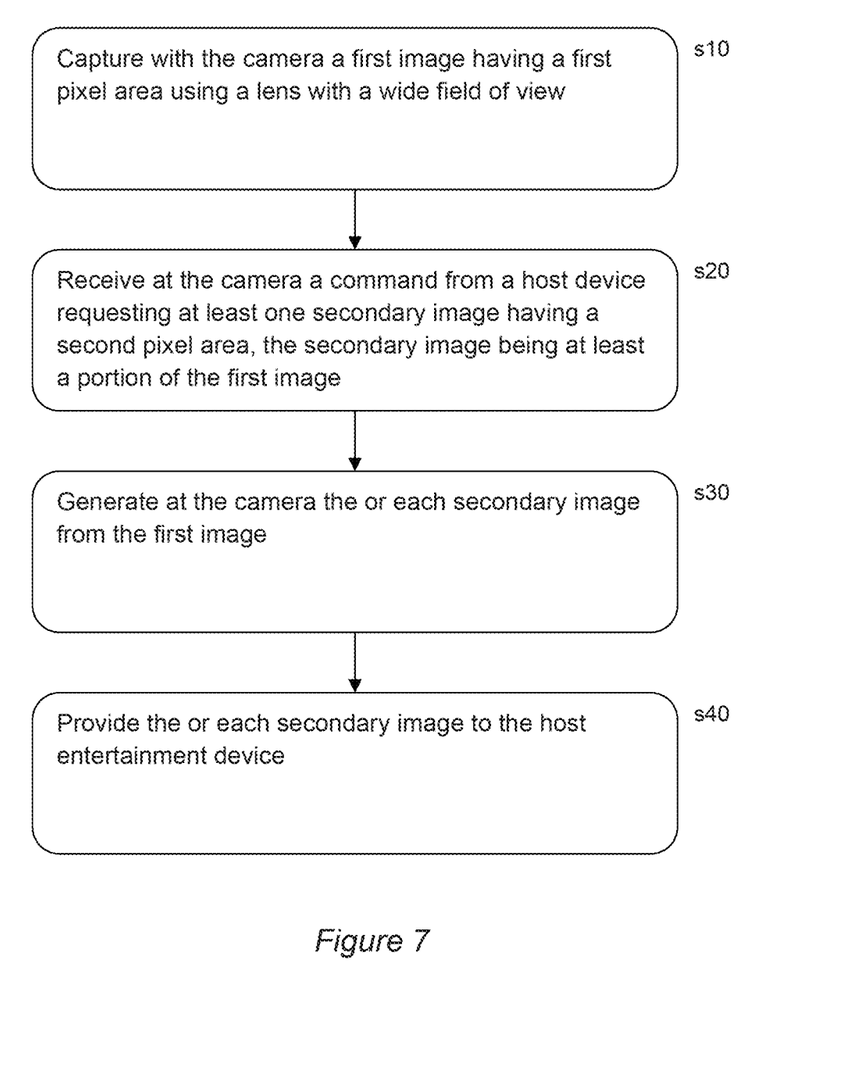
FIG. 7 is a flow diagram of a method of imaging in accordance with an embodiment of the present invention.

Finally, referring now to FIG. 7, a method of imaging by a camera for connection to a host entertainment device comprises:

in a first step s10, capturing with the camera a first image having a first pixel area using a lens with a wide field of view;

in a second step s20, receiving at the camera a command from a host device requesting at least one secondary image having a second pixel area, the secondary image being at least a portion of the first image;

in a third step s30, generating at the camera the or each secondary image from the first image; and in a fourth step s40, providing the or each secondary image to the host entertainment device.

It will be apparent to a person skilled in the art that variations in the above method corresponding to operation of the various embodiments of the apparatus as described and claimed herein are considered within the scope of the present invention, including but not limited to:

the received command requesting a secondary image comprising a 3D mapping of a portion of the first image, in which the 3D mapping transforms a section of the first image depicting a surface having a normal in a first direction to form a secondary image in which the normal of that surface faces directly out of the secondary image, and the step of generating at the camera the or each secondary image comprises implementing the 3D mapping.

It will be furthermore appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a non-transitory computer program product or similar object of manufacture comprising processor implementable instructions stored on a data carrier such as a floppy disk, optical disk, hard disk, PROM, RAM, flash memory or any combination of these or other storage media, or in the form of a transmission via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

Although illustrative embodiments of the invention have been described in detail herein with reference to the accompanying drawings, it is to be understood that the invention is not limited to those precise embodiments, and that various changes and modifications cane be effected therein by one skilled in the art without departing from the scope and spirit of the invention as defined by the appended claims.

I claim:

1. An imaging system, comprising a video camera, the video camera comprising:
   a wide field of view lens;
   an imaging sensor operable to form a first image having a first pixel area; and
   an interface operable to receive commands from a host entertainment device; in which
   the video camera is operable to receive a command requesting at least one secondary image, the command identifying a second pixel area of the at least one secondary image for a 3D mapping of a portion of the first image; and
   the imaging system further comprises a graphics processor operable to perform the 3D mapping to generate the at least one secondary image from the first image,
   in which the 3D mapping transforms a section of the first image depicting a surface having a normal in a first direction to form a given one of the at least one secondary image in which the normal of that surface faces directly out of the given secondary image, and the 3D mapping includes rotating an estimated normal of the depicted surface in 3D space so that its normal substantially coincides with the normal of a 2D plane of the given secondary image.

2. An imaging system according claim 1 in which the first image depicts a captured scene, and the 3D mapping comprises rotating the estimated normal of the depicted surface in the scene in 3D space so that its normal substantially coincides with the normal of a 2D plane of the given secondary image.

3. An imaging system according claim 1, in which the 3D mapping comprises
   estimating the plane of a surface from the position and estimated depth of at least three points in the image; and
   estimating the normal of that surface.

4. An imaging system according to claim 1, in which at least two of a plurality of requested secondary images have a different respective pixel area.

5. An imaging system according to claim 1, in which if the pixel area of a requested secondary image is not the same as the pixel area of the portion of the first image, the graphics processor resamples the corresponding portion of the first image to generate the at least one secondary image.

6. An imaging system according to claim 1, in which the wide field of view lens is a fisheye lens, and the graphics processor is operable to substantially remove from an image curvilinear distortion caused by the fisheye lens.

7. An imaging system according to claim 1, in which the video camera comprises a structured light emitter operable to emit a pattern of light onto a scene that can be captured by the imaging sensor.

8. An imaging system according to claim 7 in which the graphics processor is operable to derive a depth map from the pattern of light captured by the imaging sensor.

9. An imaging system according to claim 8 in which the graphics processor is operable to derive the normal of one or more surfaces in the first image based upon the depth map.

10. An imaging system according to claim 1, comprising:
    a host entertainment device;
    and in which the host entertainment device comprises
    an interface for connection to the video camera; and
    a processor operable to generate commands requesting from the video camera one or more of the secondary images based upon the first image captured by the video camera.

11. An imaging system according to claim 10, in which the host entertainment device comprises the graphics processor.

12. An imaging system according to claim 1, in which the video camera comprises the graphics processor.

13. A method of imaging for a camera in connection with a host entertainment device, comprising the steps of:
    capturing with the camera a first image having a first pixel area using a lens with a wide field of view;
    receiving at the camera a command from the host entertainment device requesting at least one secondary image having a second pixel area and comprising a 3D mapping of a portion of the first image; and
    performing the 3D mapping to generate the at least one secondary image from the first image;
    in which the 3D mapping transforms a section of the first image depicting a surface having a normal in a first direction to form a given one of the at least one secondary image in which the normal of that surface faces directly out of the given secondary image, and the 3D mapping includes rotating an estimated normal of the depicted surface in 3D space so that its normal substantially coincides with the normal of a 2D plane of the given secondary image.

14. A method of imaging according to claim 13, in which:
    the step of generating the at least one secondary image comprises implementing the 3D mapping at the camera, and
    the method further comprising the step of:
    providing the at least one secondary image to the host entertainment device.

15. A non-transitory computer-readable recording medium storing computer implementable instructions thereon, the instructions, when implemented on a computer, cause the computer to perform the steps of:
    capturing with the camera a first image having a first pixel area using a lens with a wide field of view;

receiving at the camera a command from a host device requesting at least one secondary image having a second pixel area and comprising a 3D mapping of a portion of the first image; and performing the 3D mapping to generate the at least one secondary image from the first image;

in which the 3D mapping transforms a section of the first image depicting a surface having a normal in a first direction to form a given one of the at least one secondary image in which the normal of that surface faces directly out of the secondary image, and the 3D mapping includes rotating an estimated normal of the depicted surface in 3D space so that its normal substantially coincides with the normal of a 2D plane of the given secondary image.

* * * * *